United States Patent
Honjo et al.

(10) Patent No.: US 9,873,082 B2
(45) Date of Patent: Jan. 23, 2018

(54) WET TYPE FLUE GAS DESULFURIZATION APPARATUS AND OPERATION METHOD OF THE SAME

(71) Applicant: MITSUBISHI HITACHI POWER SYSTEMS, LTD., Yokohama-shi, Kanagawa (JP)

(72) Inventors: Shintaro Honjo, Lake Mary, FL (US); Norikazu Inaba, Lake Mary, FL (US); Takuya Okamoto, Kanagawa (JP); Jun Hashimoto, Lake Mary, FL (US); Naoyuki Kamiyama, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 15/081,545

(22) Filed: Mar. 25, 2016

(65) Prior Publication Data
US 2016/0279564 A1    Sep. 29, 2016

Related U.S. Application Data

(60) Provisional application No. 62/139,392, filed on Mar. 27, 2015.

(51) Int. Cl.
*B01D 53/50* (2006.01)
*B01D 53/80* (2006.01)
(Continued)

(52) U.S. Cl.
CPC ......... *B01D 53/508* (2013.01); *B01D 53/346* (2013.01); *B01D 53/505* (2013.01);
(Continued)

(58) Field of Classification Search
CPC  B01D 53/508; B01D 53/80; B01D 2251/404; B01D 2258/0283;
(Continued)

(56) References Cited

U.S. PATENT DOCUMENTS 5,360,551 A * 11/1994 Weber .................. C02F 1/5209
                                                      210/719
5,560,893 A * 10/1996 Okino .................. B01D 53/504
                                                      422/110
(Continued)

FOREIGN PATENT DOCUMENTS

JP        11-267447 A     10/1999
JP     2003-340238 A     12/2003
(Continued)

OTHER PUBLICATIONS

Written Opinion dated May 17, 2016, issued in International Patent Application No. PCT/JP2016/059690, with English Translation. (8 pages).
(Continued)

*Primary Examiner* — Timothy C Vanoy
(74) *Attorney, Agent, or Firm* — Westerman, Hattori, Daniels & Adrian, LLP

(57) ABSTRACT

Provided is an absorber that removes sulfur oxide in a flue gas with an absorbent, an absorbent storing unit that stores the absorbent that has absorbed the sulfur oxide, an oxidation-reduction potential meter that measures an oxidation-reduction potential of the absorbent in the absorbent storing unit, a reducing additive supplying unit that supplies a sulfur oxoacid reducing additive into the absorbent storing unit, and a control device that controls the reducing additive supplying unit based on a measured value of the oxidation-reduction potential of the absorbent measured with the oxidation-reduction potential meter, wherein the reducing additive supplying unit supplies the sulfur oxoacid reducing additive when the measured value of the oxidation-reduction potential has exceeded an upper limit of an appropriate range of the oxidation-reduction potential.

15 Claims, 4 Drawing Sheets

(51) Int. Cl.
*B01D 53/96* (2006.01)
*B01D 53/34* (2006.01)

(52) U.S. Cl.
CPC ........ *B01D 53/80* (2013.01); *B01D 2251/404* (2013.01); *B01D 2251/606* (2013.01); *B01D 2258/0283* (2013.01)

(58) Field of Classification Search
CPC ................ B01D 53/346; B01D 53/505; B01D 2251/606; B01D 53/96; B01D 53/965
See application file for complete search history.

(56) References Cited

U.S. PATENT DOCUMENTS

| | | | | |
|---|---|---|---|---|
| 5,766,563 A * | 6/1998 | Tanaka | ................ | B01D 53/346 204/402 |
| 6,029,100 A * | 2/2000 | Iwashita | ............ | B01D 53/346 422/105 |
| 7,572,420 B2 * | 8/2009 | Honjo | .................. | B01D 53/501 423/210 |
| 8,071,060 B2 * | 12/2011 | Ukai | .................... | B01D 53/501 422/168 |
| 8,574,506 B2 * | 11/2013 | Kuroki | .................. | B01D 53/56 204/164 |
| 8,632,742 B2 * | 1/2014 | Keiser | .................... | B01D 53/96 210/749 |
| 2008/0233024 A1 | 9/2008 | Lindau et al. | | |
| 2014/0017119 A1 * | 1/2014 | DeVault | ................ | B01D 53/50 422/7 |
| 2015/0139881 A1 * | 5/2015 | Honjo | ................... | B01D 53/78 423/243.08 |

FOREIGN PATENT DOCUMENTS

| | | |
|---|---|---|
| JP | 2010-269277 A | 12/2010 |
| JP | 2012-006144 A | 1/2012 |
| JP | 2012-11317 A | 1/2012 |
| JP | 2013-006144 A | 1/2013 |
| WO | WO 2014028329 A1 * | 2/2014 ........... B01D 53/502 |

OTHER PUBLICATIONS

International Search Report dated May 17, 2016, issued in International Patent Application No. PCT/JP2016/059690. (4 pages).

* cited by examiner

WET TYPE FLUE GAS DESULFURIZATION APPARATUS AND OPERATION METHOD OF THE SAME

CROSS-REFERENCE TO RELATED APPLICATIONS

This application is based upon and claims the benefit of priority from U.S. Provisional Application No. 62/139,392, filed on Mar. 27, 2015; the entire contents of which are incorporated herein by reference.

FIELD

The present invention relates to a wet type flue gas desulfurization apparatus and an operation method of the same.

BACKGROUND

As a desulfurization facility which removes sulfur oxide in a flue gas generated by combustion of a fuel oil or coal in a thermal power station or the like, a wet type flue gas desulfurization apparatus is widely used. With the wet type flue gas desulfurization apparatus, a flue gas and a slurry absorbent (which includes a calcium compound such as limestone) are brought into contact with each other in an absorber so that sulfur oxide in the flue gas is absorbed in the slurry absorbent, and the slurry absorbent after the contact is oxidized and subjected to solid-liquid separation, with the result that gypsum is produced as a by-product.

In this case, sulfur dioxide ($SO_2$), which is a main component in sulfur oxide in the flue gas, is absorbed in the absorbent through a reaction, and reacts with oxygen in the flue gas or oxygen supplied from the outside to produce gypsum.

The concentration of oxygen in the flue gas is low and oxidation from calcium sulfite to gypsum does not proceed sufficiently with the amount of oxygen in the flue gas. Therefore, in a wet type flue gas desulfurization apparatus, an oxygen-containing gas from the outside the system is introduced into the absorbent to promote the production of gypsum. When the amount of the introduced oxygen-containing gas is small, the concentration of unoxidized calcium sulfite increases, which results in problems such as inhibition of dissolution of calcium carbonate which is an absorbing agent, and a decrease in a desulfurization performance.

On the other hand, in order to maintain a high conversion rate from calcium sulfite to gypsum, the oxygen-containing gas has to be supplied in an excessive amount in consideration of a boiler load fluctuation and the like, which leads to an increase in running cost, and an increase in chemical oxygen demand (COD) in wastewater since the generation of peroxides such as $S_2O_6$ and $S_2O_8$ may be caused thereby. Therefore, it may be necessary to adjust the amount of the introduced oxygen-containing gas to be within an appropriate range.

Regarding a controlling method for adjusting an amount of an introduced oxygen-containing gas which contributes to oxidation of calcium sulfite, a method using an oxidation-reduction potential (hereinafter referred to as "ORP") is known. In other words, a conventional method which controls, with an ORP, an amount of an introduced gas is a method in which an ORP set value is determined in advance based on a result of an obtained correlation between the ORP and the concentration of sulfurous acid, and an amount of an introduced gas is controlled by a deviation signal between each of signals of successively detected ORPs of an absorbent and the ORP set value.

However, for example, depending on the boiler combustion state, there may be a case where the concentration of oxygen ($O_2$) in the flue gas becomes higher departing from the correlation, or a case where the concentration of sulfur oxide ($SO_2$) in the flue gas becomes lower departing from the correlation. In such cases, there is the following problem. Even if the amount of oxidation air introduced into the absorbent storing unit of the wet type flue gas desulfurization apparatus is reduced to zero, sulfurous acid generated by absorption of sulfur oxide is sufficiently oxidized by natural oxidation caused by contact between the flue gas and the absorbent in the absorber. In addition, the absorbent is put into a peroxidized state by natural oxidation caused by contact between the flue gas and the absorbent in the absorber, thereby resulting in making it difficult to control the ORP to be a desired value.

For example, even in a case where an apparatus is designed such that the ORP is controlled to be an appropriate value, when the ORP fluctuates unstably between extremely high values such as 200 to 1000 mV to cause a peroxidized state, a heavy metal ion contained in the flue gas, for example, manganese, is oxidized to form manganese oxide. Due to this, there occurs a problem such as coloration of gypsum. There also occur problems such as malfunction of a pH meter, blockage of nozzles, and clogging of a solid-liquid separator caused by manganese scale deposits. In addition, there occurs problem that the absorbent could not maintain wastewater treatment standards, which necessitates a separate post-treatment, since selenium exiting in the form of tetravalent selenium ($Se^{4+}$) in the absorbent is changed to the form of hexavalent selenium ($Se^{6+}$) which is difficult to remove, and persulfuric acid or the like is generated in the absorbent.

Therefore, conventionally, the following has been proposed. The oxidation-reduction potential of an absorbent is calculated with an ORP meter, and a supply amount of an oxygen-containing gas is adjusted according to the oxidation-reduction potential. When the oxidation-reduction potential has increased above the range adjustable depending on the supply amount of the oxygen-containing gas, the oxidation-reduction potential is adjusted by supplying, to the absorbent, an oxidation inhibitor (silicon-based defoamer, oil/fat-based defoamer, fatty acid-based defoamer, mineral oil-based defoamer, alcohol-based defoamer, amide-based defoamer, phosphoric ester-based defoamer, metal soap-based defoamer, alcohol, and glycerin) (Patent Literature 1).

CITATION LIST

Patent Literature

Patent Literature 1: JP 2003-340238 A

SUMMARY

Technical Problem

However, in a case of controlling the ORP using an oxidation inhibitor proposed in Patent Literature 1, there is a possibility that the supply of the excessive amount of the oxidation inhibitor causes the oxidation inhibition in a wet type flue gas desulfurization apparatus. There are also possibilities that the purity or whiteness of the gypsum is lowered because of the oxidation inhibitor mixed with the gypsum, and thereby the quality of the gypsum which is a by-product is deteriorated.

Furthermore, there is another problem. In a case of adding, for example, an organic material as an oxidation inhibitor, the added organic material remains in the absorbent as it is, which is not preferable.

Furthermore, there is another problem. In a case of controlling an ORP by adding an oxidation inhibitor, as a result of adding a large amount of the oxidation inhibitor, there may be a case where oxidation is difficult to perform even when adding oxidation air thereafter.

The present invention has been made in view of the problems described above, and an object of the present invention is to provide a wet type flue gas desulfurization apparatus capable of controlling an ORP to be a set value even if, for example, the amount of oxidation air supplied to the absorbent storing unit is reduced to zero, and an operation method of the same.

Solution to Problem

In one aspect of the present invention, a wet type flue gas desulfurization apparatus includes an absorber that removes sulfur oxide in a flue gas with an absorbent, an absorbent storing unit that stores the absorbent that has absorbed the sulfur oxide, an oxidation-reduction potential meter that measures an oxidation-reduction potential of the absorbent in the absorbent storing unit, a reducing additive supplying unit that supplies a sulfur oxoacid reducing additive into the absorbent storing unit, and a control device that controls the reducing additive supplying unit based on a measured value of the oxidation-reduction potential of the absorbent measured with the oxidation-reduction potential meter, wherein the reducing additive supplying unit supplies the sulfur oxoacid reducing additive when the measured value of the oxidation-reduction potential has exceeded an upper limit of an appropriate range of the oxidation-reduction potential.

According to the wet type flue gas desulfurization apparatus of the invention, when an oxidation-reduction potential exceeds the upper limit of an appropriate range of the oxidation-reduction potential and it is difficult to control the oxidation-reduction potential, a sulfur oxoacid reducing additive is supplied as an additive for decreasing the oxidation-reduction potential. Therefore, the oxidation-reduction potential can be adjusted to be within the appropriate range. As a result, the absorbent is brought out of the peroxidized state, and a situation where a heavy metal ion contained in the gas, for example, manganese, is oxidized to form manganese oxide may be avoided. Accordingly, problems such as coloration of gypsum, blockage of nozzles, and clogging of a solid-liquid separator are resolved, promotion of oxidation from tetravalent selenium to hexavalent selenium is prevented, and thereby the desulfurization apparatus can be operated stably.

It is preferable that the valence of the sulfur oxoacid reducing additive is two to four.

By adjusting the valence of the sulfur oxoacid reducing additive to be two to four, a function to decrease the oxidation-reduction potential is assured, so that the oxidation-reduction potential can be adjusted to be within the appropriate range.

It is preferable that the sulfur oxoacid reducing additive is at least one of sodium thiosulfate, sodium metabisulfite, and sodium dithionite The sulfur oxoacid reducing additive is at least one of sodium thiosulfate, sodium metabisulfite, and sodium dithionite). Therefore, even if the sulfur oxoacid reducing additive is degraded thereafter, it is degraded into a sulfite ion and consequently, a desulfurization function is prevented from decreasing.

It is preferable that the appropriate range of the oxidation-reduction potential is 50 mV to 200 mV.

By setting the appropriate range of the oxidation-reduction potential at 50 mV to 200 mV, most of the oxidized mercury ions trapped in the absorbent are incorporated into the gypsum, and discharged, with the gypsum, to the outside of the system. As a result, the mercury ions do not accumulate in the absorbent, so that generation of metal mercury is prevented, and accordingly, it is possible to prevent mercury from re-scattering.

It is preferable that a flue gas duct that is connected to the absorber and discharges a purified gas that has passed through the absorber and a mercury meter that is provided in the flue gas duct and measures the concentration of mercury in the purified gas discharged from the absorber are provided, and when a value of the mercury meter exceeds a predetermined threshold value, the reducing additive supplying unit supplies the sulfur oxoacid reducing additive.

When the concentration of mercury in a purified gas exceeds a predetermined threshold value, the reducing additive including a sulfur oxoacid is supplied to control the ORP to be within the appropriate range. By doing so, the concentration of liquid phase mercury in the absorbent is decreased, mercury is prevented from scattering from the absorbent, and the concentration of mercury in the purified gas is adjusted to be the predetermined threshold value or lower.

It is preferable that an oxidizing additive supplying unit that supplies an oxidizing additive into the absorbent storing unit is included, and when the measured value of the absorbent measured with the oxidation-reduction potential meter is lower than 50 mV as a result of supplying the sulfur oxoacid reducing additive, the control device controls the oxidizing additive supplying unit to supply the oxidizing additive into the absorbent storing unit.

When the oxidation-reduction potential measured with the oxidation-reduction potential meter is lower than 50 mV as a result of supplying a sulfur oxoacid reducing additive, an oxidizing additive is supplied from the oxidizing additive supplying unit. By doing so, the oxidized mercury ions trapped in the absorbent are prevented from being reduced to metal mercury, and accordingly, re-scattering of mercury is prevented and stable desulfurization can be continued.

An operation method of a wet type flue gas desulfurization apparatus according to another aspect of the present invention includes adjusting the oxidation-reduction potential to be within the appropriate range by supplying a sulfur oxoacid reducing additive in a case where, when sulfur oxide in a flue gas is removed by an absorbent, an oxidation-reduction potential of the absorbent has exceeded an upper limit of an appropriate range of the oxidation-reduction potential.

In accordance with the operation method of the wet type flue gas desulfurization apparatus, when an oxidation-reduction potential exceeds the upper limit of the appropriate range thereof and it is difficult to control the oxidation-reduction potential, a sulfur oxoacid reducing additive is supplied as an additive for decreasing the oxidation-reduction potential. Therefore, the oxidation-reduction potential can be adjusted to be within the appropriate range.

It is preferable that the valence of the sulfur oxoacid reducing additive is two to four.

By adjusting the valence of the sulfur oxoacid reducing additive to be two to four, a function to decrease the oxidation-reduction potential is assured, so that the oxidation-reduction potential can be adjusted to be within the appropriate range.

It is preferable that the sulfur oxoacid reducing additive is at least one of sodium thiosulfate, sodium metabisulfite, and sodium dithionite.

The sulfur oxoacid reducing additive is at least one of sodium thiosulfate, sodium metabisulfite, and sodium dithionite. Therefore, even if the sulfur oxoacid reducing additive is degraded thereafter, it is degraded into a sulfite ion. Therefore, a desulfurization function is prevented from decreasing.

It is preferable that the appropriate range of the oxidation-reduction potential is 50 mV to 200 mV.

By setting the appropriate range of the oxidation-reduction potential at 50 mV to 200 mV, most of the oxidized mercury ions trapped in the absorbent are incorporated into the gypsum, and discharged with the gypsum. As a result, the mercury ions do not accumulate in the absorbent, so that generation of metal mercury is prevented, and accordingly, it is possible to prevent mercury from re-scattering.

It is preferable that when the concentration of mercury in a purified gas discharged from an absorber is measured, and the concentration exceeds a predetermined threshold value as a result of the measurement, the sulfur oxoacid reducing additive is supplied to decrease the concentration of mercury to the predetermined threshold value or lower.

When the concentration of mercury in a purified gas exceeds a predetermined threshold value, the sulfur oxoacid reducing additive is supplied to control the ORP to be within the appropriate range. By doing so, the concentration of liquid phase mercury in the absorbent is decreased, mercury in the absorbent is prevented from re-scattering, and the concentration of mercury in the purified gas is adjusted to be the predetermined threshold value or lower.

It is preferable that when a measured value of the oxidation-reduction potential of the absorbent is lower than 50 mV as a result of supplying the sulfur oxoacid reducing additive, an oxidizing additive is supplied.

When a value of the oxidation-reduction potential measured with the oxidation-reduction potential meter is lower than 50 mV as a result of supplying a sulfur oxoacid reducing additive, an oxidizing additive is supplied from the oxidizing additive supplying unit. By doing so, the oxidized mercury ions trapped in the absorbent are prevented from being reduced to metal mercury, and accordingly, re-scattering of mercury is prevented and stable desulfurization can be continued.

Advantageous Effects of Invention

According to the present invention, when an absorbent has been put into a peroxidized state in an absorber of a wet type flue gas desulfurization apparatus and an oxidation-reduction potential thereof has exceeded the upper limit of an appropriate range of the oxidation-reduction potential, a sulfur oxoacid reducing additive is supplied to prevent an excessive oxidation reaction, and thereby the oxidation-reduction potential can be controlled to be within the appropriate range thereof.

DESCRIPTION OF EMBODIMENTS

Hereinbelow, the present invention is described in detail with reference to the drawings. The present invention is not limited by the following embodiments of the present invention. Furthermore, the constituent elements in the following embodiments include those easily assumed by a person skilled in the art, those substantially the same, and those included in so-called equivalents. In addition, when the invention includes a plurality of embodiments, the invention also includes the combination of the respective embodiments.

First Embodiment

Figure 1:
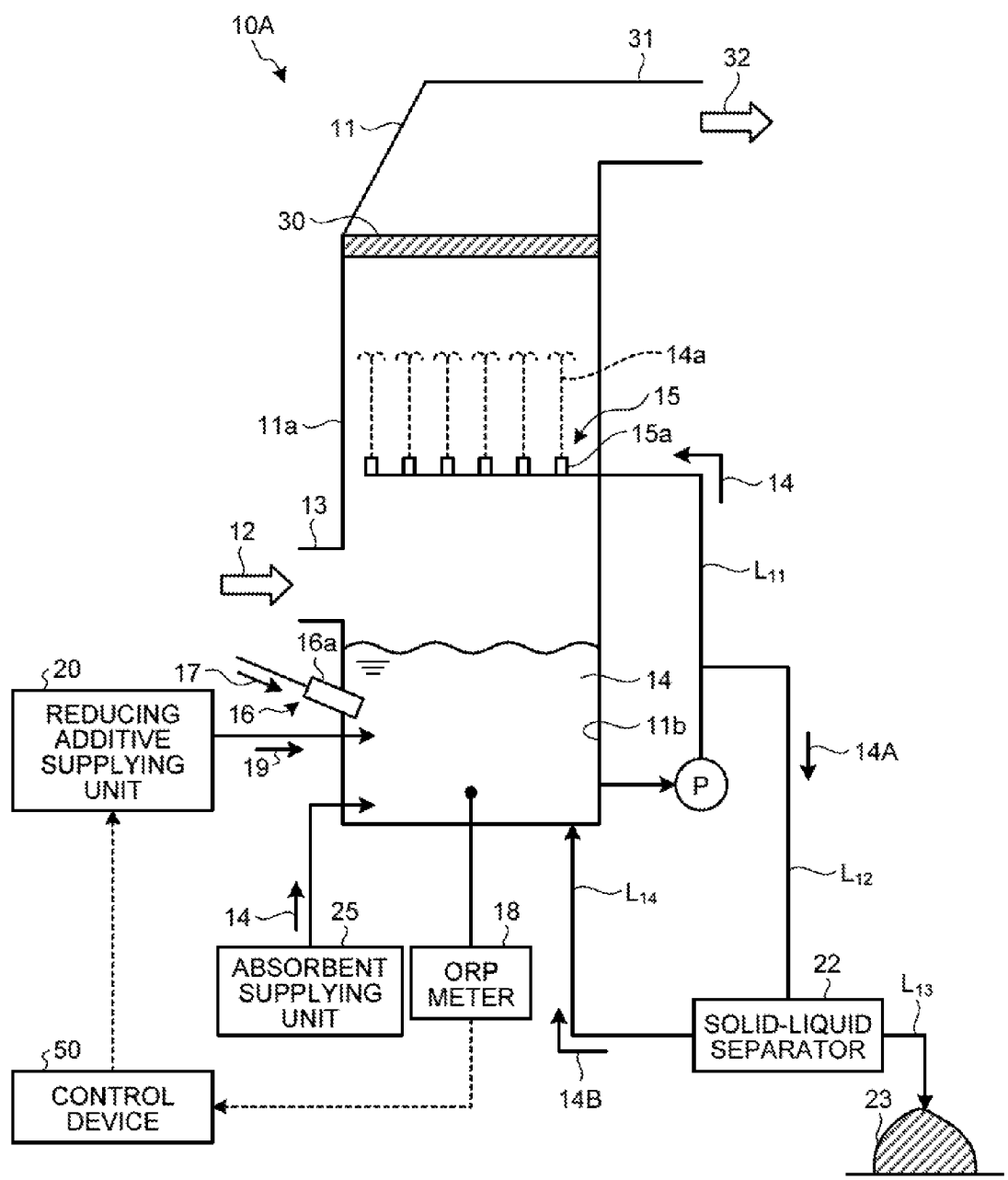
FIG. 1 is a schematic diagram illustrating a wet type flue gas desulfurization apparatus according to a first embodiment.

A wet type flue gas desulfurization apparatus according to a first embodiment of the present invention is described with reference to the drawings. FIG. 1 is a schematic diagram illustrating the wet type flue gas desulfurization apparatus according to the first embodiment. As illustrated in FIG. 1, the wet type flue gas desulfurization apparatus (hereinafter referred to as "desulfurization apparatus") 10A according to the embodiment includes an absorber 11, a gas introducing unit 13, an absorbent storing unit 11$b$, a circulation line $L_{11}$, a spouting unit 15, an air introducing unit 16, an oxidation-reduction potential meter (hereinafter referred to as "ORP meter" in the embodiment) 18, a reducing additive supplying unit 20, and a control device 50. The absorber 11 removes sulfur oxide in a gas discharged from a boiler (not illustrated) (hereinafter referred to as "flue gas") 12 with an absorbent 14. The gas introducing unit 13 is provided on a side wall 11$a$ of the absorber 11 and introduces the flue gas 12. The absorbent storing unit 11$b$ is provided in a lower part of the absorber 11 and stores the absorbent 14 which has absorbed the sulfur oxide in the flue gas 12. The circulation line $L_{11}$ circulates the absorbent 14 from the absorbent storing unit 11$b$. The spouting unit 15 is provided in the vicinity of a middle part of the absorber 11 and spouts the absorbent 14 supplied by the circulation line $L_{11}$ upward as a spouting liquid 14$a$ through a spraying unit (for example, a nozzle) 15$a$. The air introducing unit 16 supplies air 17 from a blowing unit (for example, a nozzle) 16$a$ into the absorbent storing unit 11$b$. The ORP meter 18 measures an oxidation-reduction potential (ORP) (hereinafter referred to as "ORP" in the embodiment) of the absorbent 14. The reducing additive supplying unit 20 supplies a sulfur oxoacid reducing additive (including a sulfur oxoacid and a salt of the sulfur oxoacid) 19 into the absorbent 14 or the absorbent storing unit 11$b$. When a value measured with the ORP meter 18 has exceeded the upper limit of an appropriate range of the ORP, the sulfur oxoacid reducing additive 19 is supplied to adjust the value measured with the ORP meter 18 to be within the appropriate range of the ORP (for example, 50 mV to 200 mV). In the embodiment, the sulfur oxoacid reducing additive 19 is supplied into the absorbent storing unit 11$b$ directly or indirectly.

The desulfurization apparatus 10A includes a liquid feeding pump P, a demister 30, a flue gas duct 31, a discharge line $L_{12}$, a solid-liquid separator 22, a gypsum discharge line $L_{13}$, and a separated liquid return line $L_{14}$. The liquid feeding pump P is interposed in the circulation line $L_{11}$ and feeds the absorbent 14. The demister 30 removes mist in the flue gas 12. The flue gas duct 31 discharges a purified gas 32. The discharge line $L_{12}$ is connected to the circulation line $L_{11}$ and through the discharge line $L_{12}$, a part of the absorbent 14 is drawn off. The solid-liquid separator 22 separates the gypsum 23 from the absorbent (hereinafter referred to as "desulfurization wastewater") 14A drawn off from the absorbent storing unit 11b of the absorber 11 through the circulation line $L_{11}$ and the discharge line $L_{12}$. The gypsum discharge line $L_{13}$ discharges the gypsum. The separated liquid return line $L_{14}$ returns the separated liquid 14B, from which the gypsum 23 has been separated, to the absorbent storing unit 11b.

The desulfurization apparatus 10A according to the embodiment is a desulfurization apparatus employing a limestone-gypsum method, and for example, a limestone slurry (an aqueous solution obtained by dissolving limestone powder in water) is used as the absorbent 14. A temperature in the apparatus is, for example, 50° C.

Here, in the flue gas 12, a trace amount of a harmful substance such as mercury is included in addition to nitrogen oxide and sulfur oxide. Therefore, mercury included in the flue gas 12 is removed as follows. In a process prior to denitrification, a chlorinating agent is sprayed to a high-temperature flue gas in a flue gas duct, mercury is oxidized (chlorinated) on a denitrification catalyst to water-soluble mercury chloride, and the water-soluble mercury chloride is dissolved in the absorbent 14 in the desulfurization apparatus 10A. Consequently, mercury included in the flue gas 12 is removed.

As the absorbent 14, for example, a limestone slurry is supplied from an absorbent supplying unit 25 to the absorbent storing unit 11b located in the bottom of the absorber 11. The absorbent 14 supplied to the absorbent storing unit 11b is fed to a plurality of spraying units 15a in the absorber 11 through the circulation line $L_{11}$, and the spouting liquid 14a is spouted in a fountain-like manner from the spraying units 15a toward the top side of the absorber. In the circulation line $L_{11}$, the liquid feeding pump P is provided. By driving the liquid feeding pump P, the absorbent 14 is fed to the spraying units 15a from the circulation line $L_{11}$. In the absorber 11, the flue gas 12 is introduced from the gas introducing unit 13. The flue gas 12 introduced into the absorber 11 moves upward in the absorber 11, and gas-liquid contact occurs between the flue gas 12 and the spouting liquid 14a spouted from the spraying units 15a to the top side of the absorber 11. Through the gas-liquid contact between the flue gas 12 and the spouting liquid 14a, sulfur oxide and mercury chloride in the flue gas 12 are absorbed by the absorbent 14 to be separated and removed from the flue gas 12. The flue gas 12, which has been purified by the absorbent 14, is discharged as the purified gas 32 from the flue gas duct 31 at the top side of the absorber 11, and released outside from a stack not illustrated.

In a case where the limestone slurry is used as the absorbent 14, in the absorber 11, a sulfurous acid gas $SO_2$ in the flue gas 12 and the limestone slurry cause a reaction represented by the following reaction formula (1).

$$SO_2 + CaCO_3 \rightarrow CaSO_3 + CO_2 \quad (1)$$

Furthermore, the limestone slurry which has absorbed $SO_X$ in the flue gas 12 is subjected to an oxidation treatment with the air 17 supplied into the absorbent storing unit 11b at the bottom of the absorber, and causes, with the air 17, a reaction represented by the following reaction formula (2).

$$CaSO_3 + \tfrac{1}{2}O_2 + 2H_2O \rightarrow CaSO_4 \cdot 2H_2O \quad (2)$$

As described above, $SO_X$ in the flue gas 12 is trapped in the absorber 11 in a form of gypsum ($CaSO_4 \cdot 2H_2O$).

Furthermore, as described above, a limestone slurry stored in the absorbent storing unit 11b located at the bottom of the absorber 11 is pumped and used as the limestone slurry as the absorbent 14. In the pumped absorbent 14 which is the limestone slurry, gypsum ($CaSO_4 \cdot 2H_2O$) is mixed in accordance with the reaction formulae (1) and (2), as the desulfurization apparatus 10A is operated. Hereinafter, a limestone slurry mixed with gypsum is referred to as an absorbent.

The absorbent 14 used for desulfurization in the absorber 11 is circulated by the circulation line $L_{11}$ and used again. Furthermore, a part of the absorbent 14 is discharged outside as the desulfurization wastewater 14A via the discharge line $L_{12}$ connected to the circulation line $L_{11}$, and separately fed to the solid-liquid separator 22, where a dehydration treatment thereof is performed.

The solid-liquid separator 22 separates the gypsum 23, which is a solid, and the separated liquid 14B, which is a liquid, in the desulfurization wastewater 14A. As the solid-liquid separator 22, for example, a belt filter, a centrifugal separator, or a decanter-type sedimentation centrifuge is used. Consequently, the desulfurization wastewater 14A discharged from the absorber 11 is separated by the solid-liquid separator 22 into the gypsum 23 which is a solid and the separated liquid 14B which is a liquid. In the separation, mercury chloride in the desulfurization wastewater 14A, which is a part of the absorbent 14, has been adsorbed to the gypsum 23 and is separated from the liquid together with the gypsum 23. The gypsum 23 thus separated is discharged outside the system.

On the other hand, the separated liquid 14B fed from the solid-liquid separator 22 is supplied as return water into the absorbent storing unit 11b of the absorber 11 through the separated liquid return line $L_{14}$.

In the embodiment, the ORP of the absorbent 14 in the absorbent storing unit 11b is measured with the ORP meter 18, and the ORP is maintained within an appropriate range. The ORP meter 18 includes an ORP electrode set in the absorbent 14 and a calculation section to calculate the ORP based on signals measured by the ORP electrode. The value of the ORP calculated by the calculation section is provided to a control device 50. The ORP electrode may be set anywhere of the absorbent storing unit 11b as far as the ORP electrode can measure the ORP of the absorbent 14. The ORP electrode may be also set in the circulation line $L_{11}$ through which the absorbent 14 circulates to determine the ORP of the circulating absorbent 14.

The lower limit value of the ORP is set at 50 mV. It is not preferable that the lower limit value be lower than 50 mV for the following reason. When the value is lower than 50 mV, the absorbent 14 is in a reduction region, and accordingly, mercury ions are reduced to metal mercury, which leads to re-scattering of mercury.

Here, the appropriate range of the ORP is a range of the ORP with which a part of oxidized mercury ions trapped in the absorbent 14 is prevented from being metal mercury and thereby there is no re-scattering of mercury, and mercury ions in the absorbent 14 are incorporated into the gypsum 23 and thereby mercury ions do not accumulate in the absorbent 14. The appropriate range of the ORP is determined for each plant.

In general, the appropriate range of the ORP is 50 mV to 200 mV, preferably 50 mV to 150 mV, more preferably 80 mV to 150 mV, and still more preferably 100 mV to 150 mV.

Since the appropriate range of the ORP also varies depending on plants or operation conditions, the appropriate range of the ORP is acquired in advance, during a test run. Furthermore, the appropriate range of the ORP may be changed depending on change of types of a fuel supplied to a boiler and a load fluctuation in a boiler operation. Therefore, the appropriate range of the ORP may be acquired every time when the change of types of a fuel supplied to a boiler and the load fluctuation in a boiler operation occur.

In a plant operation, the optimum one ORP value is selected from the appropriate range of the ORP to perform the operation.

For example, in a case where the absorbent 14 is put into a peroxidized state even if the amount of the oxidation air 17 supplied into the absorbent storing unit 11b is reduced to zero, the ORP of the absorbent 14 rapidly increases.

In the embodiment, in a case where the appropriate range of the ORP of the absorbent 14 is, for example, 50 mV to 200 mV, and when the ORP exceeds 200 mV, the sulfur oxoacid reducing additive 19 is supplied into the absorbent storing unit 11b and the supply amount thereof is adjusted such that the value measured with the ORP meter 18 is within the appropriate range of the ORP (50 mV to 200 mV). By doing so, the ORP of the absorbent 14 can be controlled to be within the appropriate range thereof.

This operation control is performed by a control device 50. The control device 50 adjusts a supply amount of the reducing additive 19 supplied from the reducing additive supplying unit 20 into the absorbent storing unit 11b. The adjustment is performed based on an ORP value of the absorbent 14 in the absorbent storing unit 11b of the absorber 11, which has been measured with the ORP meter 18. The operation control of the control device 50 may be automatically performed, or manually performed by an operator. The reducing additive supply unit 20 includes an agent supply line $L_{21}$ inserted into a side wall of the absorbent storing unit 11b. The reducing additive supply unit 20 is configured to supply the sulfur oxoacid reducing additive 19 into the absorbent storing unit 11b directly through the agent supply line $L_{21}$. The reducing additive supply unit 20 may have any configuration as far as the sulfur oxoacid reducing additive 19 can be supplied into the absorbent storing unit 11b. For example, the reducing additive supply unit 20 may include the agent supply line $L_{21}$ connected to the circulation line $L_{11}$, the separated liquid return line $L_{14}$ or a line that connects the absorbent supplying unit 25 and the absorbent storing unit 11b. In this case, the reducing additive supply unit 20 is configured to supply the sulfur oxoacid reducing additive 19 into the absorbent storing unit 11b indirectly by supplying the sulfur oxoacid reducing additive 19 to the absorbent 14 flowing through the circulation line $L_{11}$, the separated liquid 14B flowing through the separated liquid return line $L_{14}$ or the absorbent 14 flowing through the line that connects the absorbent supplying unit 25 and the absorbent storing unit 11b through the agent supply line $L_{21}$.

Here, as a condition with which the absorbent 14 is put into a peroxidized state even if the amount of the oxidation air 17 supplied into the absorbent storing unit 11b is reduced to zero, followings are considered. For example, there may be a case where a flue gas condition varies depending on a boiler combustion state, and the concentration of oxygen ($O_2$) in the flue gas is higher than expected, a case where the concentration of sulfur oxide ($SO_x$) in the flue gas is lower than expected when burning a fuel which contains a lower sulfur (S) than planned, and thereby an amount of oxygen ($O_2$) necessary for oxidizing sulfurous acid is decreased, or a case where a foamability of the absorbent 14 extremely increases due to an organic material (for example, fatty acids and phthalic acids) mixed with coal.

Whether the absorbent 14 is in a peroxidized state is monitored by any one of the following methods 1) to 3).

1) An ORP of the absorbent 14 is measured with the ORP meter 18. For example, in a case where the appropriate range of the ORP is set at 50 mV to 200 mV, when the ORP of the absorbent 14 has exceeded 200 mV which is the upper limit of the appropriate range of the ORP, and is, for example, about 300 mV to 1000 mV, the absorbent 14 is determined to be in a peroxidized state.

2) The degree of coloration of a gypsum slurry, which is the absorbent 14, is confirmed. For the absorbent (desulfurized wastewater) 14A drawn off from the circulation line $L_{11}$ in order to separate the gypsum, the degree of coloration thereof is confirmed by visual inspection or with a chromoscope.

When the gypsum slurry has been colored to, for example, black or brown, it is presumed that manganese oxide, obtained by oxidation of manganese which is a heavy metal ion included in the flue gas, has been generated. Accordingly, it is determined that the absorbent 14 is in a peroxidized state.

3) The degree of coloration of the gypsum 23 after dehydration with the solid-liquid separator 22 is confirmed. A part of the absorbent 14 is drawn off as the desulfurization wastewater 14A and, for example, dehydrated, and then the degree of coloration of the gypsum 23 is confirmed by visual inspection or with a chromoscope.

When the gypsum 23 has been colored to black or brown, it is presumed that manganese oxide has been generated. Accordingly, it is determined that the absorbent 14 is in a peroxidized state.

The sulfur oxoacid reducing additive 19 used in the embodiment has different properties from those of known reducing additives (for example, silicon-based defoamer, oil/fat-based defoamer, fatty acid-based defoamer, mineral oil-based defoamer, alcohol-based defoamer, amide-based defoamer, phosphoric ester-based defoamer, metal soap-based defoamer, alcohol, and glycerin).

Conditions required for the reductant used for the wet type flue gas desulfurization apparatus according to the present invention are as follows. The reductant has, as a matter of course, an excellent reducing property, and in addition, the reductant hardly remains in the absorbent 14.

When the sulfur oxoacid reducing additive is indicated as an ion, it is represented by the following general formula (A). The valence x of [S] is calculated with the following formula (B). In the present invention, the sulfur oxoacid reducing additive of which the valence x of [S] is two, three, or four is preferable.

$$S_{(y)}O_{(z)}{}^{n-} \qquad \text{formula (A)}$$

$$x=(2z-n)/y \qquad \text{formula (B)}$$

As the sulfur oxoacid reducing additive 19 which satisfies the conditions, chemicals such as thiosulfuric acid, metabisulfurous acid, and dithionous acid can be used. Specifically, at least one of sodium thiosulfate ($Na_2S_2O_3$), sodium metabisulfite ($Na_2S_2O_5$), and sodium dithionite ($Na_2S_2O_4$) as a sodium salt of sulfur oxoacid may be exemplified, but there is no limitation thereto. At least two of sodium thiosulfate ($Na_2S_2O_3$), sodium metabisulfite ($Na_2S_2O_5$), and sodium dithionite ($Na_2S_2O_4$) may be blended.

The sulfur oxoacid reducing additive 19 has an excellent reducing property and is easy to degrade in the absorbent 14. The sulfur oxoacid reducing additive 19 is oxidized to a sulfite ion. The sulfite ion exists in the absorbent 14 in a limestone-gypsum method, and therefore, the desulfurization function is not deteriorated even when the sulfur oxoacid reducing additive 19 is supplied.

As other reducing chemicals among the sulfur oxoacid chemicals, sodium sulfite ($Na_2SO_3$) and sodium bisulfite ($NaHSO_3$) may be exemplified. However, these chemicals are consumed earlier in the absorbent 14, and a reducing property thereof deteriorates in a peroxidized state. As a result, an oxidation inhibitory effect is not exerted by these chemicals when supplying a trace amount thereof. Therefore, these chemicals are not suitable as the reducing additive 19 of the embodiment.

Furthermore, as the sulfur oxoacid reducing additive 19, those of which the valence of [S] is small are favorable. The reason why those of which the valence of [S] is small are favorable is described below with reference to a reaction mechanism of a case where sodium thiosulfate ($Na_2S_2O_3$), sodium metabisulfite ($Na_2S_2O_5$), or sodium dithionite ($Na_2S_2O_4$) is used.

In sodium thiosulfate ($Na_2S_2O_3$), [S] is divalent. The dissociation formulae of sodium thiosulfate are as follows.

$$Na_2S_2O_3 \Leftrightarrow 2Na + SO_3^{2-} \quad (I)$$

$$S_2O_3^{2-} + 3H_2O \Leftrightarrow 2HSO + 4e^- \quad (II)$$

In sodium dithionite ($Na_2S_2O_4$), [S] is trivalent. The dissociation formulae of sodium dithionite are as follows.

$$Na_2S_2O_4 \Leftrightarrow 2Na + SO_4^{2-} \quad (III)$$

$$S_2O_4^{2-} + 2H_2O \Leftrightarrow 2HSO + 2e^- \quad (IV)$$

In sodium metabisulfite ($Na_2S_2O_5$), [S] is tetravalent. The dissociation formulae of sodium metabisulfite are as follows.

$$Na_2S_2O_5 \Leftrightarrow 2Na + SO_5^{2-} \quad (V)$$

$$S_2O_5^{2-} + H_2O \Leftrightarrow 2HSO \quad (VI)$$

The following two functions I and II are particularly important from the viewpoint of obtaining an appropriate ORP by supplying the reducing additive 19.

The function I is a function capable of decreasing peroxides accumulated in the absorbent 14 through an operation under a high ORP. When peroxides have accumulated in the absorbent, it is difficult to adjust the ORP to be within an appropriate range thereof only by an amount of oxidation air. Accordingly, the function I is important.

Next, the function II is a function with which followings are achieved. An ORP is adjusted to be within an appropriate range (for example, 50 mV to 200 mV), most of the oxidized mercury ions trapped in the absorbent 14 are incorporated into the gypsum, and discharged with the gypsum. As a result, the mercury ions do not accumulate in the absorbent, so that generation of metal mercury from a part of the mercury ions is prevented, and accordingly, there occurs no re-scattering of mercury.

Here, a reaction for reducing $O_2$ dissolved in the absorbent 14 is described with a case where sodium thiosulfate ($Na_2S_2O_3$) is used as the reducing additive 19.

The dissociation formula of oxygen ($O_2$) is Formula (VII) below.

$$4OH^- \Leftrightarrow 2H_2O + O_2 + 4e^- \quad (VII)$$

The dissociation formulae of sodium thiosulfate ($Na_2S_2O_3$) are the above-described Formulae (I) and (II).

Formula (II) illustrates an equilibrium formula in which a sulfur oxoacid ion (here, $S_2O_3^{2-}$) is hydrolyzed into $HSO_3^- + 4H^+$.

The potential of Formula (II) is represented by the following Formula (VIII) based on the Nernst equation.

$$E_0 = 0.491 - 0.0391 \text{ pH} + 0.0148 \log [HSO_3^-]^2/[S_2O_3^{2-}] \quad (VIII)$$

As represented by Formula (II), $H^+$ and $e^-$ are produced in the right side. Accordingly, an oxidation reaction and a reduction reaction are caused in the left side and the right side, respectively. The larger the stoichiometric coefficients of [$H^+$] and [$e^-$], the greater the reducing property and the smaller the item $[HSO_3^-]^2/[S_2O_3^{2-}]$ in Formula (VIII). Due to this, the ORP decreases, in other words, the driving force of the reduction reaction increases.

As described above, the smaller the valence of [S], the larger the amount of [$e^-$] generated. Consequently, in a case of using sodium thiosulfate ($Na_2S_2O_3$), an effect obtained by the supply thereof as the reducing additive 19 is increased, and the amount of oxoacid (here, sodium thiosulfate ($Na_2S_2O_3$)) supplied may be decreased. Therefore, the valence of [S] in the sulfur oxoacid reducing additive 19 is preferably small. Therefore, among the sulfur oxoacid reducing additive 19, sodium thiosulfate ($Na_2S_2O_3$) of which the valence of [S] is small as two, is a preferable reducing additive.

The upper limit of the valence of [S] in the sulfur oxoacid reducing additive is preferably four, and the range of the valence of [S] in the sulfur oxoacid reducing additive is preferably two to four. The reasons therefor are as follows. The reducing additive needs to have a reducing power equal to or stronger than that of sulfurous acid of which the valence of [S] is four, and it is necessary to adjust the valence of the reducing additive to be within a range with which the reducing additive is water soluble and can coexist as an ion, so that a further oxidation inhibition is not caused. The valence of [S] is set at two or more for the following reasons. Elemental sulfur, of which the valence of [S] is zero, is not suitable since it precipitates as a solid. A sulfide, of which the valence of [S] is −2, has a profound oxidation inhibitory effect and in addition, has a problem that hydrogen sulfide ($H_2S$) generated by coexistence of an acid is toxic and malodorous, which makes the handling thereof difficult. Therefore, such sulfides are not preferable.

In consideration of the above, by adjusting the valence of [S] in the sulfur oxoacid reducing additive to be two to four, a function to decrease the oxidation-reduction potential is assured, so that the oxidation-reduction potential can be adjusted to be within the appropriate range.

Test Example

Next, a desulfurization test was performed according to a limestone-gypsum method by introducing a simulation slurry simulating a gypsum slurry which is an absorbent of an actual desulfurization apparatus, and a simulation gas including $SO_2$ which simulates a boiler flue gas.

In this test, a predetermined amount of divalent mercury was added (coprecipitated) in the absorbent. Next, Mn was added as an oxidant to increase an ORP from 150 mV to 500 mV, to generate a peroxidized state. Then, a trace amount of sodium thiosulfate was supplied as a reducing additive to decrease the ORP to 200 mV.

In the peroxidized state (ORP of 500 mV) and in the state where sodium thiosulfate was supplied to decrease the ORP to 200 mV, the concentration of mercury in a gas discharged from the test apparatus was each obtained. The results are illustrated in FIG. 2.

Figure 2:
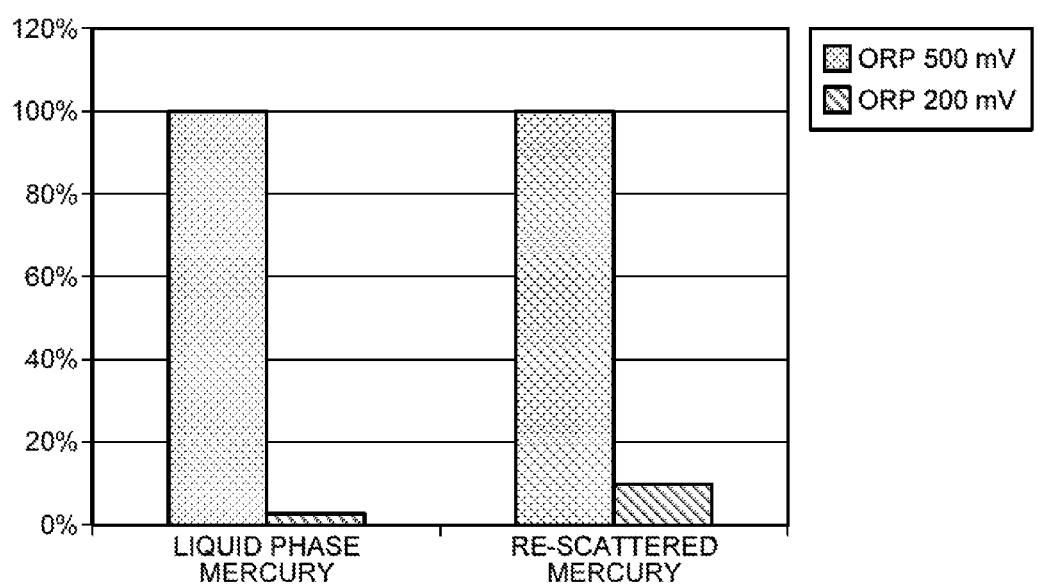
FIG. 2 is a diagram illustrating results of a desulfurization test.

FIG. 2 is a diagram illustrating the results of the desulfurization test. As illustrated in FIG. 2, when the concentration of liquid phase mercury at the high ORP of 500 mV is set at 100%, the concentration of liquid phase mercury after supplying sodium thiosulfate to decrease the ORP to 200 mV was decreased to 3%, which means 97% thereof was removed.

Furthermore, when the concentration of re-scattered mercury at the high ORP of 500 mV is set at 100%, the concentration of re-scattered mercury after the ORP decreases to 200 mV by supplying sodium thiosulfate was decreased to 10%, which means 90% thereof was removed.

Consequently, it has been confirmed by the test that by supplying a trace amount of sodium thiosulfate to decrease the ORP to 200 mV, the amount of the accumulated liquid phase mercury is decreased and an effect for inhibiting the re-scattering of mercury is exerted.

Next, an overall operation of the desulfurization apparatus 10A according to the embodiment is described.

In the desulfurization apparatus 10A according to the embodiment, for example, when the flue gas 12 from a coal combustion boiler is introduced from the gas introducing unit 13 into the absorber 11, the spouting liquid 14a of the circulating absorbent 14 which is the limestone slurry and the flue gas 12 come into contact with each other, and $SO_2$ in the flue gas 12 is removed by the absorbent 14. A predetermined amount of the air 17 is supplied into the absorbent storing unit 11b of the absorber 11 to adjust the absorbent 14 to have an appropriate ORP (for example, 150 mV). In a case where desulfurization of the flue gas 12 is continuously performed as described above and the value measured with the ORP meter 18 is stable, the desulfurization is continued in that state. In contrast, when the value measured with the ORP meter 18 has exceeded the upper limit value of the appropriate range of the ORP (for example, when the ORP has exceeded 200 mV, and is 500 mV to 1000 mV), the sulfur oxoacid reducing additive 19 is supplied into the absorbent storing unit 11b of the absorber 11 from the reducing additive supplying unit 20, and the supply amount thereof is adjusted such that the value measured with the ORP meter 18 is within the appropriate range of the ORP (for example, 50 mV to 200 mV). When the value measured with the ORP meter 18 reaches the appropriate range of the ORP (for example, 50 mV to 200 mV), the supply of the reducing additive 19 is stopped.

As described above, when the absorbent 14 in the absorbent storing unit 11b of the absorber 11 is put into a peroxidized state and the ORP thereof has exceeded the upper limit of the appropriate range of the ORP, the desulfurization apparatus 10A supplies the sulfur oxoacid reducing additive 19 to decrease the ORP, thereby the ORP of the absorbent 14 can be controlled to be within an appropriate range.

As a result, the absorbent is brought out of the peroxidized state, and re-scattering of mercury is prevented. In addition, promotion of oxidation from tetravalent selenium to hexavalent selenium is prevented. Furthermore, a stable operation of the desulfurization apparatus can be performed in which corrosion through Mn scale deposits, or the like is suppressed.

In addition, even when a reducing additive is supplied, the sulfur oxoacid reducing additive 19 is used. Therefore, even if the reducing additive is degraded thereafter, it is degraded into a sulfite ion or the like. Accordingly, the desulfurization function is not decreased. Furthermore, unlike the case where a reductant proposed in related art (for example, silicon-based reductant and oil/fat-based reductant) remains as it is, the reducing additive 19 does not remain through degradation and high-purity gypsum can be obtained.

Second Embodiment

Figure 3:
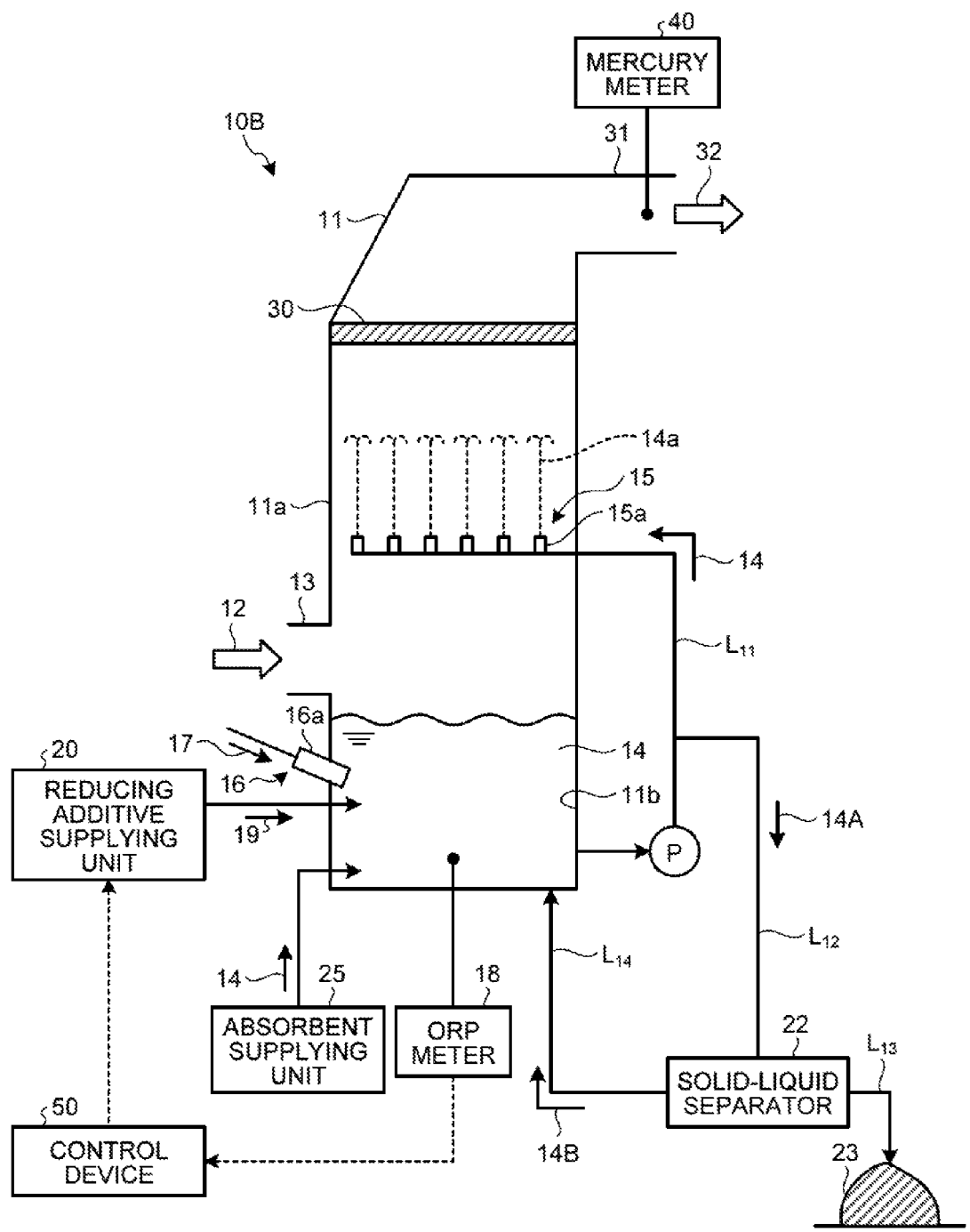
FIG. 3 is a schematic diagram illustrating a wet type flue gas desulfurization apparatus according to a second embodiment.

A wet type flue gas desulfurization apparatus according to a second embodiment of the present invention is described with reference to the drawing. FIG. 3 is a schematic diagram illustrating the wet type flue gas desulfurization apparatus according to the embodiment. Regarding the same member as that of the first embodiment, the same reference sign is attached thereto, and the description thereof is omitted.

As illustrated in FIG. 3, the desulfurization apparatus 10B of the embodiment is provided with a mercury meter 40 in the vicinity of the flue gas duct 31 which discharges the purified gas 32 in the desulfurization apparatus 10A in the first embodiment. As in a case of the first embodiment, when the sulfur oxoacid reducing additive 19 such as sodium thiosulfate is supplied to adjust an ORP, which is measured with the ORP meter 18, to be within an appropriate range of the ORP, the concentration of mercury in the purified gas 32 discharged from the absorber 11 is measured with the mercury meter 40.

When the value measured with the mercury meter 40 exceeds, as a result of the measurement, a predetermined threshold value, the sulfur oxoacid reducing additive 19 is further supplied to decrease the value measured with the mercury meter 40 to the predetermined threshold value or lower. As the predetermined threshold value of mercury, for example, a standard value for emission of mercury from a stack may be used.

Even in a case where the ORP is adjusted to be within the appropriate range thereof, when the value measured with the mercury meter 40 provided in the vicinity of the flue gas duct 31 exceeds the predetermined threshold value, the control device 50 may further supply the sulfur oxoacid reducing additive 19 such as sodium thiosulfate as a reductant to prevent the mercury from re-scattering.

As a result, the mercury is prevented from re-scattering, whereby a stable desulfurization reaction can be performed.

Third Embodiment

Figure 4:
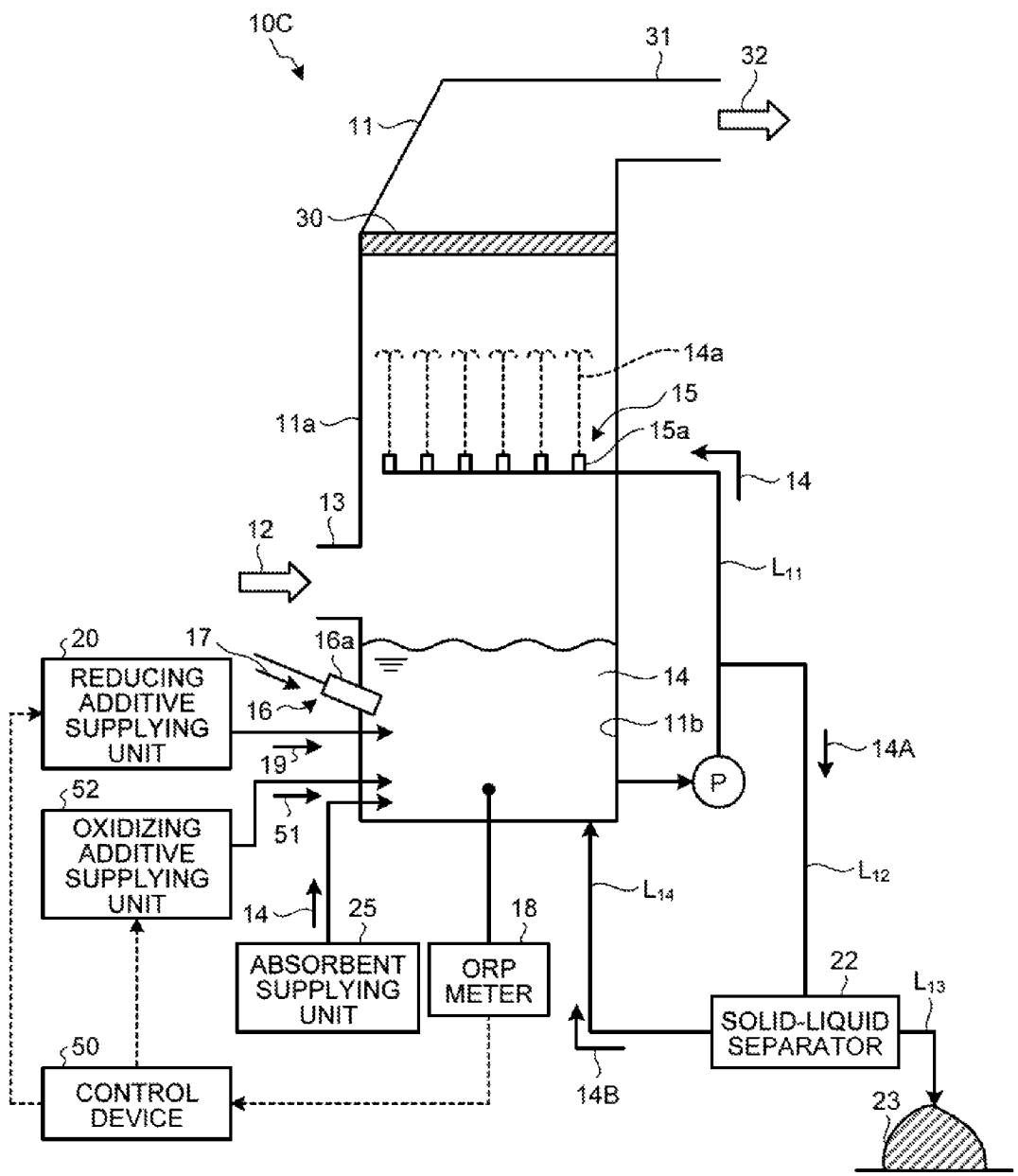
FIG. 4 is a schematic diagram illustrating a wet type flue gas desulfurization apparatus according to a third embodiment.

A wet type flue gas desulfurization apparatus according to a third embodiment of the present invention is described with reference to the drawing. FIG. 4 is a schematic diagram illustrating the wet type flue gas desulfurization apparatus according to the embodiment. Regarding the same member as that of the first embodiment, the same reference sign is attached thereto, and the description thereof is omitted.

As illustrated in FIG. 4, the desulfurization apparatus 10C according to the embodiment further includes, as compared with the desulfurization apparatus 10A according to the first embodiment, an oxidizing additive supplying unit 52. The oxidizing additive supplying unit 52 supplies an oxidizing additive 51 into the absorbent storing unit 11b directly or indirectly. When the ORP measured with the ORP meter 18 decreases to a value lower than 50 mV as a result of supplying the sulfur oxoacid reducing additive 19, the oxidizing additive 51 is supplied from the oxidizing additive supplying unit 52. This operation control is performed by a control device 50. The control device 50 measures, with the ORP meter 18, an ORP value of the absorbent 14 in the absorbent storing unit 11b of the absorber 11. Based on the measured ORP value, the control device 50 adjusts a supply amount of the oxidizing additive 51 supplied from the oxidizing additive supplying unit 52 into the absorbent storing unit 11b. The operation control may be automatically performed, or manually performed by an operator. The oxidizing additive supplying unit 52 includes an agent supply line $L_{22}$ inserted into a side wall of the absorbent storing unit 11b. The oxidizing additive supplying unit 52 is configured to supply the oxidizing additive 51 into the absorbent storing unit 11b directly through the agent supply line $L_{22}$. The oxidizing additive supplying unit 52 may have any configuration as far as the oxidizing additive 51 can be supplied into the absorbent storing unit 11b. For example, the oxidizing additive supplying unit 52 may include an agent supply line $L_{22}$ connected to the circulation line $L_{11}$, the separated liquid return line $L_{14}$ or a line that connects the absorbent supplying unit 25 and the absorbent storing unit 11b. In this case, the oxidizing additive supplying unit 52 is configured to supply the oxidizing additive 51 into the absorbent storing unit 11b indirectly by supplying the oxidizing additive 51 to the absorbent 14 flowing through the circulation line $L_{11}$, the separated liquid 14B flowing through the separated liquid return line $L_{14}$ or the absorbent 14 flowing through the line that connects the absorbent supplying unit 25 and the absorbent storing unit 11b through the agent supply line $L_{22}$.

When an ORP is decreased to a value lower than 50 mV, which is a reduction region, by supplying the sulfur oxoacid reducing additive 19, a part of oxidized mercury ions is reduced to metal mercury to cause the re-scattering of mercury. Therefore, the oxidizing additive 51 is supplied from the oxidizing additive supplying unit 52 so that the ORP is controlled to be within an appropriate range of the ORP (for example, 50 mV to 200 mV).

As the oxidizing additive 51 in the embodiment, hydrogen peroxide and an oxoacid oxidant such as persulfuric acids or hypochlorous acid are exemplified. Those exemplified as the oxidizing additive 51 are preferable since they are degraded (reduced by absorbed $SO_2$ (sulfite ions)) in the absorbent 14 in the absorbent storing unit 11b of the absorber and do not remain in the gypsum 23.

In the embodiments described above, the desulfurization apparatus employs the fountain-type spouting unit. In the fountain-type spouting unit, an absorbent which absorbs sulfur oxide in a flue gas is spouted upward from a spray nozzle or the like, and liquid droplets thereof fall down. However, the present invention is not limited thereto, and for example, the present invention may employ a spray-type spouting unit. In the spray-type spouting unit, the absorbent is dropped downward as liquid droplets directly from the spray nozzle.

REFERENCE SIGNS LIST 10A to 10C Wet type flue gas desulfurization apparatus (desulfurization apparatus)
11 Absorber
11a Side wall
11b Absorbent storing unit
12 Boiler flue gas (flue gas)
13 Gas introducing unit
14 Absorbent
16 Air introducing unit
17 Air
18 Oxidation-reduction potential meter
19 Reducing additive
20 Reducing additive supplying unit
22 Solid-liquid separator
23 Gypsum
25 Absorbent supplying unit
40 Mercury meter
51 Oxidizing additive
52 Oxidizing additive supplying unit

The invention claimed is:

1. A wet type flue gas desulfurization apparatus comprising:
an absorber that removes sulfur oxide in a flue gas with an absorbent;
an absorbent storing unit that stores the absorbent that has absorbed the sulfur oxide;
an oxidation-reduction potential meter that measures an oxidation-reduction potential of the absorbent in the absorbent storing unit;
a reducing additive supplying unit that supplies a sulfur oxoacid reducing additive into the absorbent storing unit; and
a control device that controls the reducing additive supplying unit based on a measured value of the oxidation-reduction potential of the absorbent measured with the oxidation-reduction potential meter,
wherein the reducing additive supplying unit supplies the sulfur oxoacid reducing additive when the measured value of the oxidation-reduction potential has exceeded an upper limit of an appropriate range of the oxidation-reduction potential.

2. The wet type flue gas desulfurization apparatus according to claim 1, wherein the valence of the sulfur oxoacid reducing additive is two to four.

3. The wet type flue gas desulfurization apparatus according to claim 1, wherein the sulfur oxoacid reducing additive is at least one of sodium thiosulfate, sodium metabisulfite, and sodium dithionite.

4. The wet type flue gas desulfurization apparatus according to claim 1, wherein the appropriate range of the oxidation-reduction potential is 50 mV to 200 mV.

5. The wet type flue gas desulfurization apparatus according to claim 1, comprising:
a flue gas duct that is connected to the absorber and discharges a purified gas that has passed through the absorber; and
a mercury meter that is provided in the flue gas duct and measures the concentration of mercury in the purified gas discharged from the absorber,
wherein the reducing additive supplying unit supplies the sulfur oxoacid reducing additive when a value of the mercury meter exceeds a predetermined threshold value.

6. The wet type flue gas desulfurization apparatus according to claim 1, further comprising an oxidizing additive supplying unit that supplies an oxidizing additive into the absorbent storing unit,
wherein the control device controls the oxidizing additive supplying unit to supply the oxidizing additive into the absorbent storing unit when the measured value of the absorbent measured with the oxidation-reduction potential meter is lower than 50 mV as a result of supplying the sulfur oxoacid reducing additive.

7. An operation method of a wet type flue gas desulfurization apparatus, comprising:
adjusting the oxidation-reduction potential to be within the appropriate range by supplying a sulfur oxoacid reducing additive in a case where, when sulfur oxide in a flue gas is removed by an absorbent, an oxidation-reduction potential of the absorbent has exceeded an upper limit of an appropriate range of the oxidation-reduction potential.

8. The operation method of a wet type flue gas desulfurization apparatus according to claim 7, wherein the valence of the sulfur oxoacid reducing additive is two to four.

9. The operation method of a wet type flue gas desulfurization apparatus according to claim 7, wherein the sulfur oxoacid reducing additive is at least one of sodium thiosulfate, sodium metabisulfite, and sodium dithionite.

10. The operation method of a wet type flue gas desulfurization apparatus according to claim 7, wherein the appropriate range of the oxidation-reduction potential is 50 mV to 200 mV.

11. The operation method of a wet type flue gas desulfurization apparatus according to claim 7, wherein when the concentration of mercury in a purified gas discharged from an absorber is measured and the concentration exceeds a predetermined threshold value as a result of the mercury measurement, the sulfur oxoacid reducing additive is supplied to decrease the concentration of mercury to the predetermined threshold value or lower.

12. The operation method of a wet type flue gas desulfurization apparatus according to claim 7, wherein when a measured value of the oxidation-reduction potential of the absorbent is lower than 50 mV as a result of supplying the sulfur oxoacid reducing additive, an oxidizing additive is supplied.

13. The operation method of a wet type flue gas desulfurization apparatus according to claim 12, wherein the valence of the sulfur oxoacid reducing additive is two to four.

14. The operation method of a wet type flue gas desulfurization apparatus according to claim 12, wherein the sulfur oxoacid reducing additive is at least one of sodium thiosulfate, sodium metabisulfite, and sodium dithionite.

15. The operation method of a wet type flue gas desulfurization apparatus according to claim 12, wherein the appropriate range of the oxidation-reduction potential is 50 mV to 200 mV.

\* \* \* \* \*